June 9, 1942.  R. L. NOWLAND  2,285,456
CAMERA AND FINDER
Filed Feb. 25, 1939
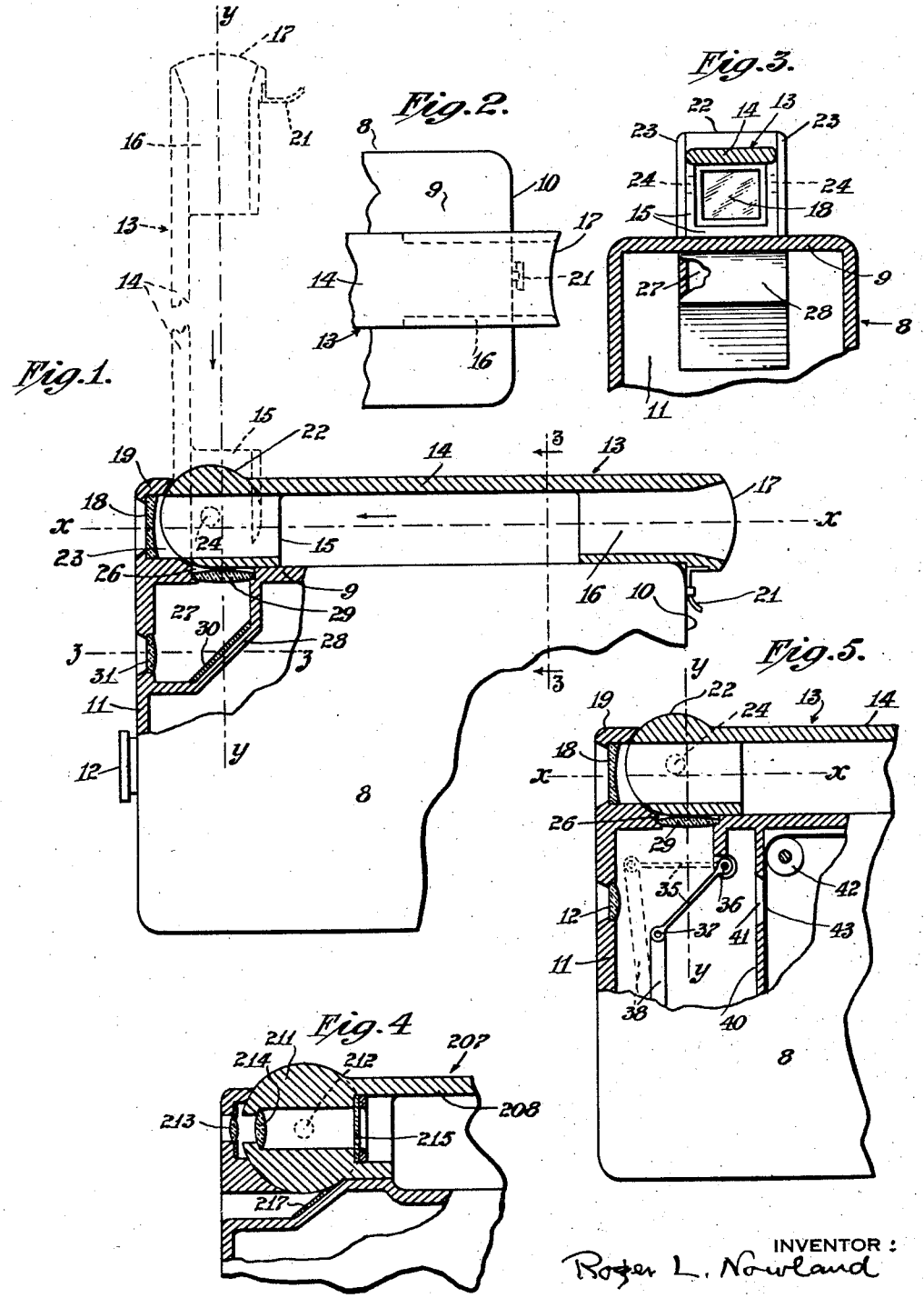

Patented June 9, 1942

2,285,456

UNITED STATES PATENT OFFICE 2,285,456

CAMERA AND FINDER

Roger L. Nowland, New York, N. Y.

Application February 25, 1939, Serial No. 258,357

3 Claims. (Cl. 88—1.5)

This invention is a novel camera and finder, having reference to a camera with which is combined a special finder, adaptable for various uses, whether for ordinary picture-taking photography, or for special uses such as motion picture photography.

This patent is a continuation in part of United States Patent No. 2,148,493 granted February 28, 1939, upon an application No. 32,009 filed July 18, 1935, showing cameras of the motion picture class, and Fig. 11 of which more especially contains the disclosure upon the basis of which the present patent is a continuation.

The general object of the present invention is to afford a camera-finder combination of superior convenience and high efficiency in practical use. A particular object is to provide, for a camera, a finder, comprising a sight tube, so constructed and arranged as to constitute also a carrying handle for the camera; this object being carried out in such manner that while the combined finder and handle are normally horizontal, mounted for example on top of the camera, they may be swung away or upwardly to a right angle or substantially 90° position, permitting the finder to be used in that manner for the taking of photographs or motion pictures, to be thereafter restored to normal position. A further object is to provide an operative combination between a camera finder, such as already referred to, and the exposing mechanism of the camera lens so that, in a practical manner, the camera lens may constitute a part of the optical system of the finder.

Further objects and advantages of the invention will be explained in the hereinafter following description of certain illustrative embodiments thereof. To the attainment of such objects and advantages the present invention consists in the novel camera and finder, and the novel features of operation, combination, arrangement and construction herein illustrated or described.

In the accompanying drawing:

Fig. 1 is a side elevation view of a camera with finder constructed and operating according to the present invention, with a considerable part of the figure shown in vertical section central to the axis or line of sight of the finder, in the normal position of the parts, with the upswung or 90° position thereof indicated in dotted lines.

Fig. 2 is a partial top plan view showing the rear end of the camera and finder of Fig. 1.

Fig. 3 is a transverse vertical section view taken on the line 3—3 of Fig. 1.

Fig. 4 is a partial view corresponding with the front or left end of Fig. 1, but illustrating a modification corresponding with the particular construction disclosed in said prior patent.

Fig. 5 is a view generally similar to Fig. 1, but showing a further development of the invention wherein the finder is combined with the camera exposing means.

Referring first to the embodiment of Figs. 1 to 3, the camera body or casing 8 may be of any conventional or desired form, having various bounding walls including top wall 9, rear wall 10 and front wall 11 in which may be positioned a suitable exposing lens 12.

Mounted upon the top wall 9 is shown a combined handle and finder 13, extending substantially the full length of the camera. The middle part of this combined element constitutes a handle bar 14, spaced substantially from the top of the camera, leaving a finger space, to accommodate the hand in the convenient carrying of the camera. The combined element 13 provides also the sight tube for the finder, this being interrupted at the middle but comprising a front tube portion or end 15 and a rear sight tube portion 16, the extreme end of which constitutes an eye rest 17.

The horizontal optical axis or line of sight $x$—$x$ is shown as extending centrally through the sight tubes so that when the eye is placed at the tube extremity 17 it is properly positioned for finding and sighting purposes. The described parts may enclose a square passage, and at the front end thereof is shown a square lens 18, of any well known type adapted for finding purposes, for example a plano-concave lens. The lens is shown accommodated in a square upstanding projection or housing 19 at the upper front corner of the camera. The parts thus far described constitute a combined finder and handle, the finder lens being preferably of the kind affording a brilliant image, without the need or use of a ground glass or similar screen. The lens 18 may be considered as representative of any lens-means or optical means suitable for finding purpose. In certain specific aspects it is believed the arrangements disclosed are novel for finding use irrespective of handle use.

Preferably the combined handle and finder is swingable from the normal or horizontal position shown in full lines in Fig. 1 to the vertical position shown in dotted lines, permitting sighting to be performed by looking downwardly through the sight tube. For these purposes the combined element 13 is swingingly fulcrumed at its front end and is provided with a spring clip or catch 21 at its rear end for securing it to the rear end of the camera body when in normal or carrying position.

The swinging mounting of the member 13 is afforded by providing it with a cylindrical enlargement 22 at its front end adapted to turn in fixed mountings, consisting of side extensions or walls 23 from the housing 19, a fulcrum or pivot stud 24 being indicated at each side thereof. These arrangements permit the release of the clip 21 for the swinging of the sight tube from horizontal to vertical position, its return being accompanied by an automatic relatching of the parts in normal position.

When in the vertical or 90° position the optical arrangements may be as follows. The line of sight y—y is now vertical. The observer looks downwardly through the sight tube which is now in line with an opening 26 in the camera top wall. Within the upper front corner of the camera is a finder recess 27 provided by walls 28. In the line of vision is indicated a field lens 29, below which is a diagonal mirror 30, set preferably at 45°. This deflects the light axis from the vertical to a horizontal direction z—z, and on this horizontal axis is located the objective lens 31. The combined parts 31—29 constitute the optical means for finding the image in this adjustment, and preferably the optical means is such as to obviate the need of a ground glass, the image being perceived as a brilliant one, and preferably of square outline as in the case of horizontal finding.

In the embodiment partly shown in Fig. 4 the general arrangements may be similar to Figs. 1 to 3, but differently designed and specifically arranged, as in said prior patent. The principal differences are in the optical means. Fig. 4 shows a combined finder and handle 207, with finger space below the handle bar 208. The member 207 has the cylindrical head 211 turning on pivot pins 212. There is a fixed front or objective lens 213, and a field lens 214 mounted in the head 211 of the sight tube, with a ground glass 215 to the rear of it. These optical elements 213, 214 and 215 afford horizontal finding operation. When the sight tube is adjusted to vertical position the optical elements 214 and 215 may cooperate with other optical parts below, such as a diagonal mirror 217, in this case fixedly mounted exterior to the camera top wall, at the rear end of a light passage provided between the camera wall and the finder mountings.

In the modification shown in Fig. 5 the finder means is combined with the camera mechanism in such a way that the regular camera lens 12 is now employed as the objective lens of the finder system. This is done by providing a diagonal mirror 35 which may be shifted or swung into the diagonal finding position, when no exposure is being made, or out of position to permit exposure. This is preferably done by a swinging motion of the mirror, by which it is adapted to serve as the camera shutter, its shifting or swinging from and to finding position operating to admit light from the lens 12 to a sensitive plate or film to the rear.

This Fig. 5 modification contains a number of parts substantially the same as in Figs. 1 to 3, and correspondingly numbered, such as the combined handle-finder member 13, lens 18 for horizontal finder, pivot 24 for swinging to upright position, and field lens 29 on the axis of the vertical finding position. In this embodiment however the fixed diagonal mirror is replaced by a mirror 35, mounted for shifting into and out of finding position. Such shifting is preferably effected by swinging about a fulcrum 36, shown located at the upper-inner edge of the mirror. The figure shows the finding position in full lines, while in dotted lines the mirror is shown swung to position to permit camera exposures. While this shifting of the mirror might be performed manually, for example by an exterior extension of the fulcrum shaft 36, it is preferably done by interior means under the same control as the exposing action. Thus the free edge of the diagonal mirror 35 is shown connected by a pivot 37 with a link 38, connected in suitable manner with the exposure mechanism of the camera. In the case of a motion picture camera the link 38 may be connected with movable parts adapted to operate the camera shutter.

Fig. 5 indicates, to the rear of the retractible mirror 35, a wall 40 having an aperture 41 for exposure purposes. A guide or wheel 42 is shown constituting a conventional means for guiding a sensitive film 43 which may, in the case of a motion picture camera, be moved intermittently in the usual manner, in synchronism with the operations of the shutter 35.

Such use of a tilting shutter, which is also a deflecting mirror permits the regular objective lens of the camera to be used for finding purposes, obviating any parallax. When the mirror shields the film it operates the finder, and vice versa. The lower-front or free edge of the mirror-shutter swings quickly past the lens in an effective manner for shutter purposes, the edge moving quite close to the lens and being adapted to rise and fall in quick oscillating manner. The finding function is thus restored with minimum interruption, and in the case of motion pictures gives practically adequate or continuous finding operation.

Since various matters of arrangement, design and detail may be modified within the novel principles hereof, it is not intended to limit the invention thereto except as specifically so limited in the appended claims.

What is claimed is:

1. In combination, a camera, and mounted on its top wall an exterior combined finder sight tube and handle member, said member being fulcrumed at its front end upon said camera top wall to swing in a fore-and-aft plane at right angles to the focal plane between a lowered horizontal position adjacently parallel to the wall and an upstanding viewing position at an angle thereto, said member being shaped between its ends above said top wall to form a handle bar spaced sufficiently from the wall to accommodate several fingers below the handle bar, and centrally located for balanced carrying, releasable holding means normally to retain the tubular member in position parallel to said wall whereat it may be used as either a finder or handle, and optical finding means including said sight tube, and cooperating optical means operable for finding purposes in both positions of the tube; such optical means comprising for horizontal sighting a first lens fixed on the camera located in the light path when the sight tube is horizontal, and for vertical sighting a second fixed lens located in the light path when the tube stands upright, and a diagonal mirror cooperating with the second lens.

2. In combination, a camera, and mounted on its top wall an exterior combined finder sight tube and handle member, said member being fulcrumed at its front end upon said camera top wall to swing in a fore-and-aft plane at right angles to the focal plane between a lowered horizontal position parallel to the wall and an upstanding viewing position at an angle thereto, said member being shaped between its ends above said top wall to form a handle bar spaced sufficiently from the wall to accommodate several fingers below the handle bar, and located for balanced carrying, holding means operable normally to retain the tubular member in position parallel to said wall whereat it may be used as either a finder or handle, and optical finding means including said sight tube member, and cooperating optical means operable for finding purposes in both positions of the tube; such optical means comprising for horizontal sighting a first lens fixed on the camera located in the light path when the sight tube is horizontal, and for vertical sighting a diagonal mirror on the camera and an objective lens, both located in the light path when the tube stands upright, said objective lens being in front of the mirror, and there being in the same light path a third optical instrument, between the sight tube and the mirror, and adapted to assure a non-inverted image.

3. The combination as in claim 2 and wherein for horizontal sighting the lens is plano-concave, while for vertical sighting the objective lens is plano-convex and the third instrument is a double convex lens producing a brilliant image.

ROGER L. NOWLAND.